United States Patent [19]

Bryson et al.

[11] Patent Number: 4,735,812

[45] Date of Patent: Apr. 5, 1988

[54] FOOD BROWNING AGENT

[75] Inventors: Ian Bryson, Cumbernauld; Ian A. Easton, Glasgow, both of Scotland

[73] Assignee: Devro, Inc., Somerville, N.J.

[21] Appl. No.: 856,737

[22] Filed: Apr. 28, 1986

[30] Foreign Application Priority Data

Apr. 29, 1985 [GB] United Kingdom ............... 8510866

[51] Int. Cl.⁴ .............................................. A23L 1/272
[52] U.S. Cl. .................... 426/262; 426/243; 426/265; 426/268; 426/576; 426/305; 426/652; 426/656
[58] Field of Search ............... 426/576, 243, 262, 265, 426/268, 305, 652, 656

[56] References Cited

U.S. PATENT DOCUMENTS

| | | | |
|---|---|---|---|
| 4,426,443 | 1/1984 | Shank | 426/576 |
| 4,448,791 | 5/1984 | Fulde et al. | 426/262 |
| 4,518,618 | 5/1985 | Hsia et al. | 426/652 |
| 4,528,204 | 7/1985 | Shank | 426/576 |
| 4,547,377 | 10/1985 | Ogawa et al. | 426/268 |

*Primary Examiner*—Jeanette Hunter

[57] ABSTRACT

A browning agent particularly for use in microwave cooking comprises collagen, or gelatine hydrolyzed to its constitutent amino acids, plus one or more reducing sugars and alkalis.

The collagen preferably is derived from bovine hides. The alkali is preferably a mixture of sodium carbonate and bicarbonate.

The browning agent is capable of browning at 1000° C. or less, down to about 70° C.

It may be incorporated into a film or used as a powder or a liquid.

9 Claims, No Drawings

FOOD BROWNING AGENT

The present invention relates to a food browning agent, that is to say a composition which, when added to food facilitates the browning of the food and particularly the browning of the external surface of the food during cooking.

Many browning agents have been prepared but many of them suffer from the disadvantage that they introduce undesirable flavour into the food and may also introduce colouring e.g. food dye.

One of the natural browning reactions of food during conventional cooking is caused by the well-known Maillard reaction which is the reaction between reducing sugars and the amino acids of the proteins in the food. This reaction, however, only occurs at normal cooking temperatures and does not occur fast enough at temperatures encountered in microwave ovens. The present invention is based on the Maillard reaction but is catalysed by the adition of alkali to allow the reaction to take place at lower temperatures.

An object of the present invention is to provide a colourless browning agent which has a substantially neutral flavour and is subsequently undetectable on the cooked food and thus does not interfere with the food but produces a desirable browning effect during cooking, specifically during cooking with microwave ovens.

According to the present invention, a food browning composition comprises collagen or gelatine which has been substantially completely hydrolysed to its constituent amino acids and to which has been added one or more reducing sugars and one or more alkalis.

The food browning composition or agent of the present invention is especially intended for application to uncooked meat, fish, and poultry, or to products derived from uncooked meat, fish, and poultry. The desired browning is effected during heating. The food browning composition, after being applied to the outer surface of the uncooked meat or other product which it is desired to brown, is capable of browning by application of heat or by induction of heat from the microwave energy in a microwave oven, when the temperature of the product to which is applied, is raised to 70° C. or higher.

The food browning composition or agent is substantially colorless at ambient temperature and has a neutral flavor. It is undetectable on the cooked food (save that the food now appears brown as though it had been cooked by conventional oven cooking methods rather than by microwave cooking).

The food browning composition or agent of the present invention contains the following three required types of ingredients:

(1) Collagen or gelatin (which is derived from collagen) which has been completely hydrolyzed to its constituent amino acids, i.e. acid hydrolyzed collagen.

(2) One or more reducing sugars, which reducing sugar can be a ketose or aldose, or a mixture thereof, or can be a pentose or hexose, or a mixture thereof, e.g. glucose. ribose, fructose and maltose, etc.

(3) One or more alkalis, e.g. sodium carbonate, sodium bicarbonate, and preferably a mixture of sodium carbonate and sodium bicarbonate.

In the food browning compositions of the present invention, the various types of required ingredients are present in certain ratios. Thus, the molar ratio of the reducing sugar(s) (ingredient 2 above) to amino acids [i.e. acid hydrolyzed collagen](ingredient 1 above) can range between 1:1 and 4:1 and preferably is between 2:1 and 3:1. The alkali(s) (ingredient 3 above) is present in such amount as is required in order that the food browning composition has a pH between 7.0 and 10.0, preferably between pH 9.0 and 9.5. More detailed and specific information about the invention follows:

Preferably collagen is employed which is derived from a pure source such as a bovine (ox or cow) hide. If gelatine is employed it is preferably derived from the same source. By using collagen derived from a pure source the resultant browning agent is substantially colourless and has a flavour, compatible with natural food flavouring.

This can be explained by the fact that collagen, particularly when derived from a pure source such as cow or ox hide contains substantially very low levels of sulphur containing amino acids (0.5% methionine, cysteine absent in type 1 collagen) which may give rise to strong undesirable food flavours. Consequently, the collagen derived browning agent, being substantially free from sulphur containing amino acids, does not introduce undesirable flavours into the food during cooking.

Glutamic acid will be released during acid hydrolysis and the sodium glutamate formed during neutralisation will act as a flavour enhancer or taste synergist when the browning agent is used in cooking.

One reason why a browning agent in accordance with this invention is very successful compared with known browning agents is that collagen contains a higher proportion of glycine that any other naturally occurring protein used in foodstuffs. Collagen contains about 33% glycine whereas other readily available protein sources contain much lower percentages of glycine, e.g. egg white 5.5% and casein 3.5%.

The presence of the high glycine content results in a very good browning performance particularly when used with meat in microwave cooking.

The browning composition may in addition to the amino acids resulting from the hydrolysis of the collagen contain additional gelatine and/or a substance which enhances food adhesion.

The alkali is preferably a mixture of sodium carbonate and sodium bicarbonate. A preferred reducing sugar is glucose.

For example, there may be 1.8 parts by weight of glucose and 0.8 parts by weight of sodium carbonate and 1.4 parts by weight of sodium bicarbonate to every one part by weight of acid hydrolysed collagen.

The browning agent can be in the form of a powder, a paste, a solution or can be incorporated in a film. Preferably the film, in this instance, would be in the form of a "cling-film", i.e. a very thin film which may be wrapped around and cling to meat or other food. The browning agent can be incorporated in a film-forming gel where it is mixed thoroughly prior to casting of the film or prior to extrusion of the film, for example where the film is a collagen sausage casing.

A typical browning agent in accordance with the present invention contains one part by weight of acid hydrolysed collagen or gelatine which has been neutralised and evaporated to dryness, 1.8 parts by weight of glucose and 2.2 parts by weight of a mixture of sodium carbonate and bicarbonate, the whole being reduced to a fine powder. If this powder is incorporated in a collagen film, the weight of the film being approximately ten times the weight of the applied browning agent, a useful browning film is produced for application to foodstuff.

From another aspect the invention relates to a method of producing a food browning agent comprising:
- a. acid hydrolysing collagen or gelatine to its constituent amino acids;
- b. neutralising the solution of amino acids;
- c. evaporating the solution until dry;
- d. adding a reducing sugar;
- e. adding a mixture of sodium carbonate and bicarbonate to catalyse the reaction and provide a buffering effect; and
- f. reducing the product to a fine powder.

The method may also comprise adding gelatine or a polysaccharide such as locust bean gum before reducing to a fine powder.

One method of producing the food browning agent of the present invention will now be described. The starting material is a collagen pulp dispersion containing 10% collagen and 90% water. This pulp is derived from good quality cow or ox hide comminuted into quarter inch (0.64 centimeter) pieces and then ground or otherwise reduced to pulp in water.

Ten liters of the collagen pulp solution is heated to 100° Centigrade. The solution is cooled to room temperature and any lipids formed on the surface removed. 1.5 liters of 10M hydrochloric acid are added and the solution refluxed for 24 to 36 hours (the amino acids being checked by hplc).

On cooling, approximately 3 liters of 5M sodium hydroxide or sodium phosphate solution are added (to pH approximately 7). The solution is then evaporated to dryness to yield approximately 1.9 kilograms of solid material comprising amino acids and sodium chloride. The process has now produced the desired acid hydrolysed collagen. A typical browning agent may be manufactured by adding to the hydrolysed collagen a reducing sugar such as ribose or glucose and a base such as a mixture of sodium carbonate and bicarbonate which catalyses and therefore speeds up the browning reaction when the browning agent is used. Other reducing sugars which may be used are, for example, mannose, fructose, maltose, galactose and arabinose. The reducing sugar can be a ketose of aldose or a mixture thereof, or a pentose or hexose or a mixture thereof.

The reducing sugar and sodium carbonate and bicarbobate may be added with or without additional gelatine or a polysaccharide and the whole milled to a fine powder.

This powder may be used by sprinkling it on food or it may be used in a concentrated solution in water which is brushed or otherwise applied to food or it may be cast into the form of a film of e.g. gelatine or collagen.

Incorporation of the browning agent of this invention into a collagen film may be effected as follows:

Collagen pulp is swollen in alkali and comminuted at low temperature (5°-20° C.). The browning ingredients, acid hydrolysed collagen and a sugar are added to the resulting gel and mixed under high shear (15°-25° C.). Sodium carbonate and bicarbonate, gelatine or a polysaccharide gum are also added at this stage. Glycerol is added, (to plasticise the resulting film) and the gel degassed under vacuum.

The film is then cast and the gel air dried to yield a film for food applications.

In a particular example of this process, 3 liters of a 1% collagen pulp in water (i.e. 30 g collagen) is adjusted to pH 10 with a 1M sodium hydroxide solution. The pulp undergoes comminution, keeping the temperature between 5°-20° C., to form a flowable gel like colloidal dispersion, hereinafter referred to as gel. 1g of acid hydrolysed collagen and 1.8g of glucose are added and the gel mixed under high shear (15°-25° C.). 2.2 g of a mixture of sodium carbonate and bicarbonate are added and 2 g of gelatine may also be added at this point. Glycerol (10 ml) is added and the gel degassed under vacuum. A film is then cast, partially neutralised and dried by a current of air (25°-30° C.). This yields a film for food applications of area around 0/7 m2.

If gelatine or polysaccharide is added to the browning agent it is preferably 1 to 4 parts by weight to 1 part by weight of the acid hydrolysed collagen.

Typical examples of browning agents made in accordance with this invention using different sugars are:

| | | |
|---|---|---|
| Acid Hydrolysed Collagen | 7.2 g | 16.8% |
| Fructose | 12.4 g | 29.0% |
| Sodium bicarbonate | 10.0 g | 23.4% |
| Sodium carbonate | 6.0 g | 14.0% |
| Locust bean gum | 7.2 g | 16.8% |
| Acid Hydrolysed Collagen | 7.2 g | 13.1% |
| Maltose | 24.4 g | 45.5% |
| Sodium bicarbonate | 10.0 g | 18.3% |
| Sodium carbonate | 6.0 g | 11.0% |
| Locust bean gum | 7.2 g | 13.1% |
| Preferred formulation | | |
| Acid Hydrolysed Collagen | 7.2 g | 16.7% |
| Glucose | 12.8 g | 29.6% |
| Sodium bicarbonate | 10.0 g | 23.1% |
| Sodium carbonate | 6.0 g | 13.9% |
| Locust bean gum | 7.2 g | 16.7% |

The browning agent has been found particularly effective when used on meat which is cooked in microwave ovens. The browning agent has a particular advantage in relation to microwave ovens in that it is very difficult to brown meat satisfactorily in a microwave oven without using special apparatus. By using a film or powder embodying the present invention, and covering the meat with it, browning is produced without the use of additional heating or hot air sources which are conventionally used for browning meat in a microwave oven.

An advantage of the browning agent embodying the present invention is that it will brown at temperatures of 100° C. or less, e.g. down to 70° C.

The browning agents compositions shown are capable of browning by application of heat or by induction of heat by microwave energy when the product temperature is raised to 70° C. or higher. They are especially useful when used on uncooked meat, fish, poultry or products derived therefrom to affect browning during the heating process.

What is claimed is:
1. A food browning composition or agent, which is substantially colorless at ambient temperature, but browns when applied to uncooked meat, fish and poultry products or products derived therefrom and is then heated to a temperature of 70° C. or higher in a microwave oven whereby the resultant cooked product appears as though it had been cooked by conventional oven cooking methods, said food browning composition or agent comprising a mixture of the following three required types of ingredients:
   (1) collagen or gelatin which has been substantially completely hydrolysed to its constituent amino acids containing no or substantially low levels of sulfur containing amino acids;

(2) one or more reducing sugar(s) selected from the group consisting of ketose(s), aldose(s), pentose(s), hexose(s), or mixtures thereof; and, (3) one or more alkali(s) or mixtures thereof, wherein the aforesaid three types of ingredients are present in amounts such that the molar ratio of reducing sugar(s) to amino acids is between 1:1 and 4:1, and the alkali(s) is present in such amount as required so that the pH of the food browning composition or agent is between 7.0 and 10.0.

2. A composition according to claim 1 where the collagen is derived from animal hides.

3. A composition according to claim 2 where the collagen is derived from bovine hides.

4. A composition according to claim 3 in the form of a powder, a paste, a solution or incorporated in a film.

5. A food browning composition incorporated in a film according to claim 4, wherein the film is made of collagen or of a film forming protein or carbohydrate material.

6. A food browning composition incorporated in a film according to claim 5, wherein the film is a collagen sausage casing.

7. A food browning composition according to claim 3, wherein the alkali used is sodium carbonate, sodium bicarbonate or a mixture thereof.

8. A food browning composition according to claim 3, wherein the reducing sugar used is glucose, fructose or maltose.

9. A food browning composition according to claim 8 having the following composition.

| Ingredient | % By Weight |
|---|---|
| Acid Hydrolysed Collagen | 16.7 |
| Glucose | 29.6 |
| Sodium bicarbonate | 23.1 |
| Sodium carbonate | 13.9 |
| Locust Bean Gum | 16.7 |

* * * * *